July 21, 1936. M. A. COMEAU 2,048,058
CUTTER
Filed Aug. 13, 1935
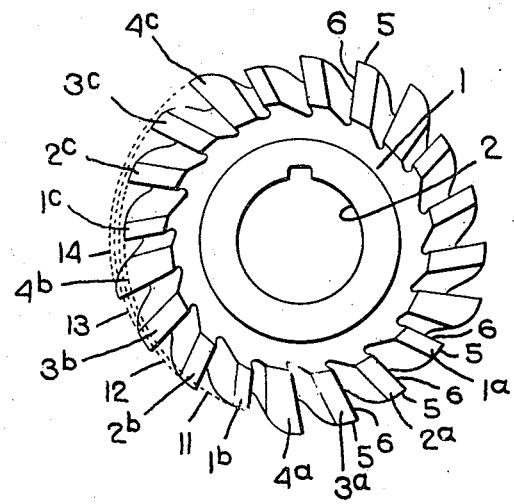
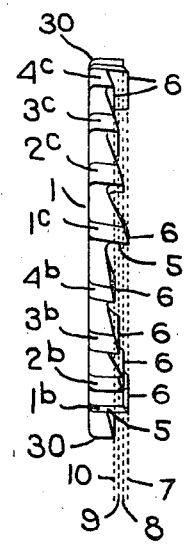
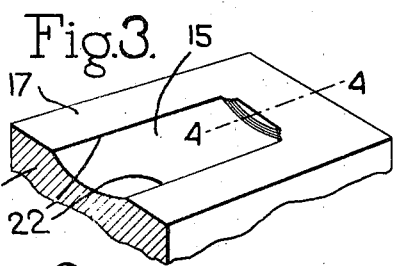
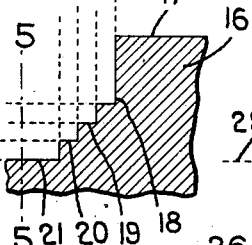
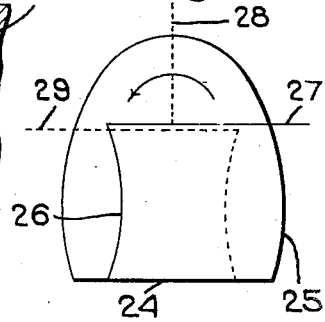
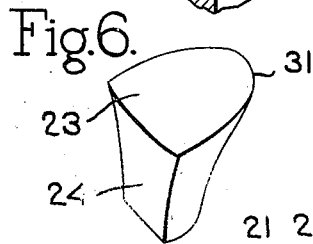
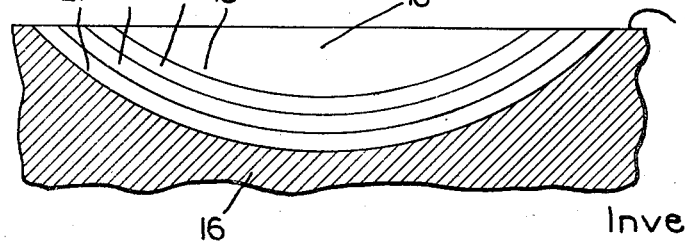
Inventor.
Melburn A. Comeau
by Heard Smith & Tennant.
Attys.

Patented July 21, 1936

2,048,058

UNITED STATES PATENT OFFICE 2,048,058

CUTTER

Melburn A. Comeau, Bradford, Mass.

Application August 13, 1935, Serial No. 35,951

7 Claims. (Cl. 144—240)

This invention relates to cutters such as are used on a milling machine or a planing machine for cutting wood, fibre and other material, and it has for its object to provide a novel cutter which is especially designed for cutting a depression in the surface of a block which is in the nature of a shallow groove having a concavely-curved bottom, which cutter will produce a clean-cut groove with smooth unbroken non-chipped edges.

A further object of the invention is to provide a novel cutter which will perform the cutting operation progressively both in a direction perpendicular to the face in which the groove or depression is formed and in a direction parallel to said face.

My improved cutter is constructed with the cutting teeth arranged in similar groups, there preferably being the same number of teeth in each group. The teeth in each group vary in radial length progressively from the tooth at one end of the group to the tooth at the other end of the group, this progressive variation of the radial length of the teeth providing for forming the cut progressively in a direction at right angles to the face of the block in which the groove is being cut. Each tooth of the cutter is also provided with a side cutting edge, and the cutting edges of the side faces of the teeth of any group have a varying position progressively in a direction parallel to the axis of rotation, such varying position resulting in forming the cut progressively in a direction parallel to the face of the block. Furthermore, the tooth of each group which has the side cutting edge in the most advanced position is the tooth which has the shortest radial dimension and the tooth of each group which has its side cutting edge in the most retracted position is the tooth having the longest radial dimension. Hence, when the cutter is in operation the shortest teeth which have the most advanced side cutting edges make the first cut in the block and cut a shallow groove, the teeth having the next longest radial dimension and which have their side cutting edges in the second advanced position make a second cut which deepens the groove formed by the first teeth of each group, the succeeding teeth of each group operating to still further deepen the groove, and the last tooth in each group serving to finish the groove or depression and give it its required dimension. By thus performing the cutting operation progressively both in a direction perpendicular to the face of the work and in a direction parallel to said face, a groove or depression of the required depth can be made with a perfectly smooth edge without danger of chipping the material in which the groove is being cut even though said material is of a nature which will readily chip at the edge.

In order to give an understanding of the invention I have illustrated in the drawing a selected embodiment thereof which will now be described after which the novel features will be pointed out in the appended claims.

In the drawing:

Fig. 1 is a side view of a cutter embodying the invention.

Fig. 2 is an edge view thereof.

Fig. 3 is a perspective view of a block having a depression cut therein by my improved cutter.

Fig. 4 is an enlarged section on the line 4—4, Fig. 3 showing the manner in which the cut is made.

Fig. 5 is an enlarged section on the line 5—5, Fig. 4 and which also illustrates the manner in which the cut is made.

Fig. 6 is a view illustrating a wooden heel in which the concave heel seat has been formed by means of my improved cutter.

Fig. 7 is a plan view illustrating the manner in which the cutter is manipulated to form the concave heel seat of the wooden heel.

The cutter embodying my invention is shown generally at 1 and it is constructed with the usual central opening 2 to receive the arbor or spindle of the milling or other machine in which the cutter is used. The cutter is of that type having a plurality of radial teeth, each of which has an end-cutting edge as well as a side face cutting edge, and in accordance with my invention the teeth of the cutter are arranged in groups, the teeth of each group having a progressively varying radial length, and the side-cutting edges of the teeth of each group have a varying position in the direction parallel to the axis of the cutter.

In the present embodiment of my invention there are four teeth in each group which are designated 1, 2, 3 and 4, and in order to distinguish between the different groups I will, for convenience, use the reference numerals 1a, 2a, 3a, 4a for the teeth of one group and 1b, 2b, 3b, 4b for the teeth of another group, and 1c, 2c, 3c, 4c for the teeth of still another group, etc. Each tooth has an end-cutting edge 5 and also a side-cutting edge 6, the teeth being properly ground as usual to provide clearance. The first tooth of each group, that is, the teeth 1a, 1b, 1c, etc., are the shortest teeth in a radial direction and the fourth tooth of each group, that is, the teeth 4a, 4b, 4c, etc., are the longest teeth in a radial direction, the other teeth of each group having a progressively-increasing radial direction from the shortest tooth to the longest tooth. This is well illustrated in Fig. 1 wherein the arcuate line 11 indicates the path of travel of the end cutting face of the shortest teeth 1a, 1b, 1c, etc., the arcuate line 12 indicates the path of travel of the end-cutting face of the next shortest teeth 2a, 2b, 2c, etc., the arcuate line 13 indicates the path of travel of the end cutting face of each of the teeth 3a, 3b, 3c, etc., while the arcuate line 14 indicates the path of travel of the end face of the longest teeth 4a, 4b, 4c, etc.

The shortest teeth of each group, to wit, the teeth 1a, 1b, 1c, etc., have their side face cutting edges 6 situated in a more advanced position in the direction of feed than the side cutting edges 6 of the other teeth of the group, and the longest teeth 4a, 4b, 4c, etc., have the least advanced position in the direction of feed, the side faces 6 of the intermediate teeth having a progressive relative position. This is clearly seen in Fig. 2 wherein the side edge 6 of the teeth 1a, 1b, 1c, etc. occupy a plane extending at right angles to the axis of rotation which is indicated by the dotted line 7, while the side faces 6 of the teeth 2a, 2b, 2c, etc., occupy a plane indicated by the dotted line 8, the side faces of the teeth 3a, 3b, 3c, etc., occupy another plane indicated by the dotted line 9, while the side faces of the longest teeth 4a, 4b, 4c, etc., occupy a plane indicated by the dotted line 10.

If a straight groove or depression 15 is to be cut in a block 16 the direction of feed (whether the feeding is accomplished by movement of the block or by movement of the cutter relative to the block) is parallel to the face 17 of the block in which the groove is to be cut. During the cutting operation the shorter teeth 1a, 1b, 1c, etc., the side cutting faces 6 of which are in the most advanced position, make a concave cut in the face of the block which is indicated by the cut 18 in Fig. 4, the teeth 2a, 2b, 2c, etc., make a deeper cut indicated at 19, the teeth 3a, 3b, 3c, etc., make a still deeper cut indicated at 20, while the teeth 4a, 4b, 4c, etc., make the final cut indicated at 21 in Fig. 4. There is, therefore, a progressive cutting of the material in a direction perpendicular to the face 17 due to the different lengths of the teeth in each group. As the feeding movement continues these cuts 18, 19, 20, 21 of different depths are progressed in a direction parallel to the face 17, and hence there is a progressive cutting of the material both in a direction at right angles to the face 17 and in a direction parallel thereto. In this way the material is cut or removed from the block in small chips and in such way there is no danger of chipping or injuring the edges 22 of the groove 15 during the cutting operation, even though the material of the block 16 is of a nature which will readily chip.

My cutter is especially useful in cutting the concave heel seat 23 in the top face of the wooden heel 24. When used in this way the cutter is caused to act on the top face of the heel 24 to cut a groove extending from one edge 25 of the heel to a point somewhat beyond the center as indicated by the line 26 in Fig. 7 which is a top plan view of the heel. The cutter is advanced in a straight line to about the point indicated by the line 27 and then the heel is turned relative to the cutter so that the cutter will have a swinging movement into and through the position indicated by the line 28 and into the position indicated by the line 29 after which the cutter and heel are moved relatively in a right line to complete the cut. In order to provide for this swinging movement of the heel relative to the cutter without causing any injury to the heel surface, I propose to round off the corner of the cutter as shown at 30. This permits the cutter to have the swinging movement without marring or injuring the heel. When the cut has been completed the heel is provided with a concave heel seat such as shown in Fig. 6, and this is accomplished without any chipping or marring of the edge 31 of the heel even though the cutting operation is carried clear to said edge.

I claim:

1. A rotary cutter having a plurality of teeth divided into similar groups, each tooth having a side cutting edge, the teeth of each group having a progressively-varying radial dimension and each of the cutting edges of the teeth of any group having a different position in the direction of the axis of the cutter.

2. A rotary cutter having a plurality of teeth which are divided into similar groups, each tooth having a side cutting edge and an end cutting edge, the teeth of each group having a progressively-varying radial dimension and each of the side cutting edges of the teeth of any group having a different position in the direction of the axis of the cutter from that of the side edges of the other teeth of the group.

3. A rotary cutter having a plurality of teeth divided into groups, each tooth having a side cutting edge, the teeth of each group having a progressively-varying radial dimension from the first to the last tooth of the group and the side cutting edges of the teeth of any group having a progressively-varying position in a direction parallel to the axis of the cutter.

4. A rotary cutter having a plurality of teeth divided into groups, each tooth having a side cutting edge, the teeth of each group having a progressively-varying radial dimension from the first to the last tooth of the group and the side cutting edges of the teeth of any group having a progressively-varying position in a direction parallel to the axis of the cutter with the tooth of least radial dimension having its side cutting edge in the most advanced position.

5. A rotary cutter having a plurality of teeth divided into similar groups, each tooth having a side cutting edge, the teeth of each group having a progressively-varying radial dimension and each of the cutting edges of the teeth of any group having a different position in the direction of the axis of the cutter, each tooth having a rounded corner at the junction of its end face and back face.

6. A rotary cutter having a plurality of teeth divided into groups, each tooth having a side cutting edge, the teeth of each group having a progressively-varying radial dimension from the first to the last tooth of the group and the side cutting edges of the teeth of any group having a progressively-varying position in a direction parallel to the axis of the cutter, the tooth of greatest radial dimension having its side cutting edge in the least advanced position.

7. A rotary cutter having a plurality of teeth divided into groups, each tooth having a side cutting edge, the teeth of each group having a progressively-varying radial dimension from the first to the last tooth of the group and the side cutting edges of the teeth of any group having a progressively-varying position in a direction parallel to the axis of the cutter, the tooth of each group which has the least radial dimension having its side cutting edge in the most advanced position and the tooth of each group which has the greatest radial dimension having its side cutting edges in the least advanced position.

MELBURN A. COMEAU.